United States Patent
Stenbratt et al.

(10) Patent No.: US 12,459,368 B2
(45) Date of Patent: Nov. 4, 2025

(54) BRAKING ARRANGEMENT FOR HEAVY DUTY VEHICLES

(71) Applicant: Volvo Truck Corporation, Gothenburg (SE)

(72) Inventors: Ulf Stenbratt, Vallda (SE); Leo Laine, Härryda Västra Götaland (SE); Hamid Yhr, Gråbo (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 260 days.

(21) Appl. No.: 18/038,769

(22) PCT Filed: Dec. 1, 2020

(86) PCT No.: PCT/EP2020/084076
§ 371 (c)(1),
(2) Date: May 25, 2023

(87) PCT Pub. No.: WO2022/117176
PCT Pub. Date: Jun. 9, 2022

(65) Prior Publication Data
US 2024/0017623 A1    Jan. 18, 2024

(51) Int. Cl.
*B60L 7/22* (2006.01)
*B60K 7/00* (2006.01)
(Continued)

(52) U.S. Cl.
CPC .............. *B60L 7/22* (2013.01); *B60K 7/0007* (2013.01); *B60L 7/08* (2013.01); *B60L 7/18* (2013.01);
(Continued)

(58) Field of Classification Search
CPC .... B60L 7/22; B60L 58/15; B60L 7/08; B60L 7/18; B60L 7/28; B60L 2240/465;
(Continued)

(56) References Cited

U.S. PATENT DOCUMENTS

| 1,072,329 | A | * | 9/1913 | Yao et al. | ............. B25B 27/304 141/390 |
| 8,639,421 | B2 | * | 1/2014 | Harnisch | ................... B66F 9/24 180/65.21 |

(Continued)

FOREIGN PATENT DOCUMENTS

| CN | 107618495 A | 1/2018 |
| CN | 108036953 A | 5/2018 |

(Continued)

OTHER PUBLICATIONS

DE102014108083 translation, Satzger et al. (Year: 2014).*

(Continued)

*Primary Examiner* — Jacob S. Scott
*Assistant Examiner* — Michael E Butler
(74) *Attorney, Agent, or Firm* — Sage Patent Group

(57) ABSTRACT

A braking arrangement for decelerating a heavy duty vehicle, the arrangement including a control unit, at least one electric machine arranged for regenerative braking, an electrical energy absorption device, an eddy current braking device, and a power distribution network arranged to connect the electric machine to the energy absorption device and to the eddy current braking device, wherein the control unit is configured to distribute regenerated electrical power from the electric machine between the energy absorption device and the eddy current braking device by the power distribution network in dependence of a target deceleration value of the heavy duty vehicle.

14 Claims, 6 Drawing Sheets

(51) Int. Cl.
  *B60L 7/08* (2006.01)
  *B60L 7/18* (2006.01)
  *B60L 7/28* (2006.01)
  *B60L 58/15* (2019.01)
  *B60T 8/172* (2006.01)
  *B60T 8/1761* (2006.01)
  *H02P 3/14* (2006.01)
  *H02K 49/04* (2006.01)

(52) U.S. Cl.
  CPC ................. *B60L 7/28* (2013.01); *B60L 58/15* (2019.02); *B60T 8/172* (2013.01); *B60T 8/17616* (2013.01); *H02P 3/14* (2013.01); *B60K 2007/0092* (2013.01); *B60L 2240/465* (2013.01); *B60T 2270/602* (2013.01); *H02K 49/046* (2013.01)

(58) Field of Classification Search
  CPC .......... B60K 7/0007; B60K 2007/0092; B60T 8/172; B60T 8/17616; H02P 3/14
  USPC ................................... 701/22, 70, 71, 74, 75
  See application file for complete search history.

(56) References Cited

U.S. PATENT DOCUMENTS

| | | | |
|---|---|---|---|
| 2016/0082843 A1 | 3/2016 | Semsey et al. | |
| 2019/0337391 A1* | 11/2019 | Crombez | B60W 30/18127 |
| 2020/0317060 A1 | 10/2020 | Dunning | |
| 2021/0086623 A1* | 3/2021 | Yao | B60W 30/18172 |

FOREIGN PATENT DOCUMENTS

| | | | | |
|---|---|---|---|---|
| DE | 102014108083 A1 * | 12/2015 | | B60L 7/00 |
| KR | 20190076358 * | 7/2019 | | B60W 30/18 |
| WO | 2013186158 A2 | 12/2013 | | |

OTHER PUBLICATIONS

International Search Report and Written Opinion of the International Searching Authority, PCT/EPXXXXXX, mailed Feb. 10, 2021, 9 pages.

* cited by examiner

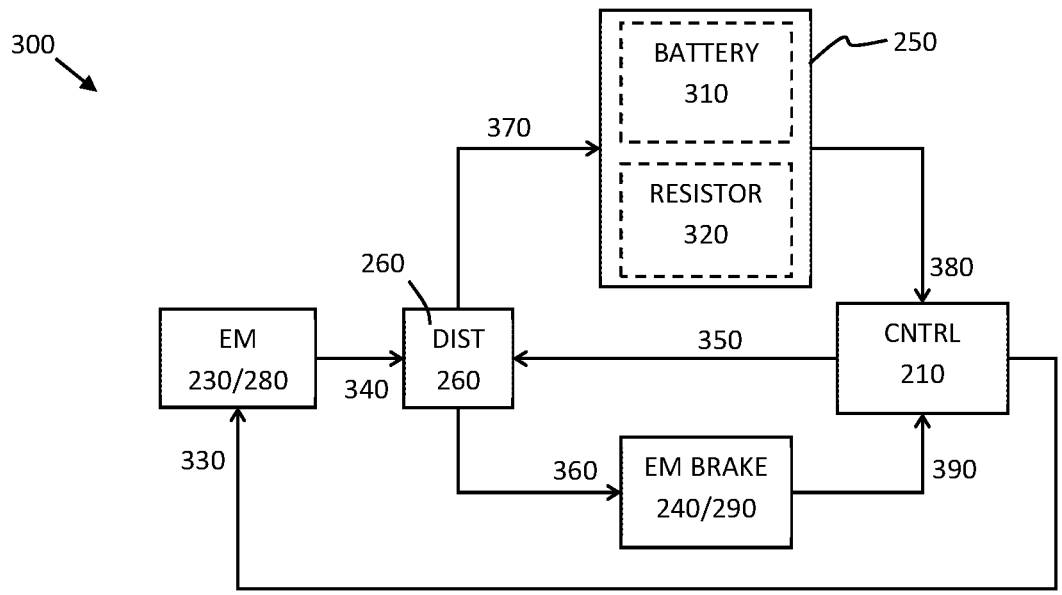
FIG. 3
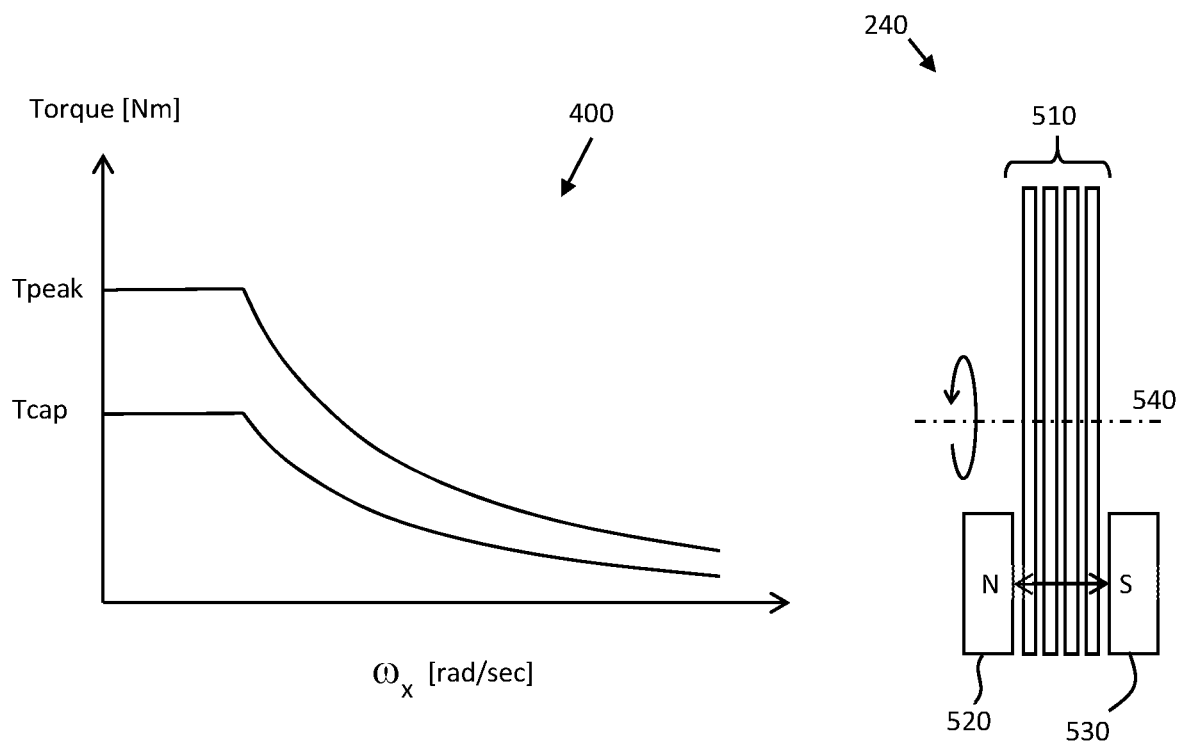
FIG. 4
FIG. 5

BRAKING ARRANGEMENT FOR HEAVY DUTY VEHICLES

CROSS REFERENCE TO RELATED APPLICATIONS

This application is a 35 U.S.C. § 371 national stage application of PCT International Application No. PCT/EP2020/084076 filed on Dec. 1, 2020, the disclosure and content of which is incorporated by reference herein in its entirety.

TECHNICAL FIELD

The present disclosure relates to heavy-duty vehicles such as semi-trailer vehicles for cargo transport, and in particular to arrangements for decelerating the heavy duty vehicle based on combinations of electrical braking devices. Although the invention will be described mainly with respect to semi-trailer vehicles and trucks, the invention is not restricted to this particular type of vehicle but may also be used in other types of vehicles.

BACKGROUND

A heavy-duty vehicle, such as a truck or semi-trailer vehicle, normally comprises a service brake system based on friction brakes. Friction brakes such as disc brakes or drum brakes are not capable of prolonged periods of use which may occur when driving downhill for an extended period of time. If the friction brakes are used too intensively, a phenomenon referred to as brake fading may occur. Brake fading is caused by a build-up of heat in the braking surfaces and leads to significantly reduced braking capability. To avoid brake fading, heavy duty vehicles often comprise auxiliary brakes capable of endurance braking, such as engine brakes and various retarder systems.

Electric machines can also be used to brake a vehicle, i.e., to generate braking torque. The electric machine then acts as a generator which converts the kinetic energy from the vehicle into electrical energy. This electrical energy can be fed to a rechargeable battery, or to a brake resistor which dissipates the electrical energy as heat. Electrical machines are normally associated with a limited braking torque capability, and the energy dissipation capability is limited.

WO 2013/186158 discloses a type of vehicle brake arrangement based on a combination of an electric machine and an eddy current brake. This arrangement is able to generate more torque compared to the electric machine alone.

However, there is a continuing need for further improvements in braking arrangements for heavy duty vehicles which are able to provide sufficient braking torque, also for extended periods of time, which are not susceptible to brake fading.

SUMMARY

It is an object of the present disclosure to provide braking arrangements for decelerating a heavy duty vehicle which alleviate at least some of the above-mentioned issues.

This object is at least in part achieved by a braking arrangement for decelerating a heavy duty vehicle. The arrangement comprises a control unit, at least one electric machine arranged for regenerative braking, an electrical energy absorption device, an eddy current braking device, and a power distribution network arranged to connect the electric machine to the energy absorption device and to the eddy current braking device, wherein the control unit is configured to distribute regenerated electrical power from the electric machine between the energy absorption device and the eddy current braking device by the power distribution network in dependence of a target deceleration value of the heavy duty vehicle. The control unit is also configured to control the distribution of regenerated electrical power from the electric machine between the energy absorption device and the eddy current braking device in dependence of an energy absorption capability of the energy absorption device. This means that the control unit will divert power away from the energy absorption device and to the eddy current brake in case the braking torque generated by the electrical machine alone is not enough for the current braking maneuver. The control unit will also divert power away from the energy absorption device in case the energy absorption device cannot absorb the surplus energy generated by electrical machine. Thus, if a deceleration maneuver generates too much energy for the absorption device to handle, then the eddy current braking device is activated to relieve the energy absorption device. This means that requirements on the energy absorption device can be relaxed, which is an advantage. Also, this control option allows for a more refined control and optimization of the regenerative braking operations.

To guarantee vehicle downhill grade ability, the eddy current braking device and the electric machine are dimensioned to support a constant cruising speed during extended downhill driving. To design for downhill grade ability means that the electric machine is dimensioned to provide a continuous negative torque level then distribute the regenerated energy to the eddy current braking device when the energy absorption capability of the energy absorption device is depleted.

According to aspects, the control unit is configured to control the distribution of regenerated electrical power from the electric machine between the energy absorption device and the eddy current braking device such that a constant baseline torque level is generated by the eddy current braking device, wherein the torque applied by the electric machine is modulated to control wheel slip at a desired wheel slip level. This way an efficient and robust brake blending operation can be performed, where the eddy current device applies a baseline braking effect and the electric machine modulates a braking torque on top of the baseline braking torque to perform high bandwidth control of wheel slip.

According to aspects, the eddy current braking device comprises a plurality of electrically conductive discs attached to a wheel axle for generating braking torque. The plurality of discs serve to generate both extra braking torque and also improved cooling of the electrically conductive discs, thereby increasing the braking capacity of the eddy current brake device.

According to aspects, the energy absorption device comprises a rechargeable battery and the control unit is configured to control the distribution of regenerated electrical power from the electric machine between the rechargeable battery and the eddy current braking device in dependence of a state of charge (SOC) of the rechargeable battery. This means that the requirement on peak energy absorption capability of the rechargeable battery can be reduced. Since peak currents can be absorbed by the eddy current braking device instead.

If the battery is almost fully charged, then power will automatically be diverted from the battery and to the eddy current braking device. On the other hand, if the SOC is such as to allow more charge, the power will be diverted to the battery instead of to the eddy current device. The power distribution network is arranged to smoothly distribute electrical energy between the battery and the eddy current brake. The present arrangement may also reduce the need for additional braking resistances configured to absorb peak energy surges in the energy regeneration system, or the requirements placed on such resistances, which is an advantage.

According to aspects, the energy absorption device comprises at least one resistor, and preferably an array of resistors, configured to dissipate excess electrical energy from the electric machine and to regulate a voltage level of the braking arrangement. This braking resistance can be used as back-up for regulating energy levels in the braking system.

According to aspects, the electric machine is associated with a peak braking torque level above a braking torque capability level of the electric machine, which peak braking torque level can be maintained by the electric machine for a limited duration of time, wherein the control unit is configured to request a braking torque level from the electric machine between the peak braking torque level and the braking torque capability level to decelerate the heavy duty vehicle. Extra braking torque can be requested from the electric machine for a limited duration of time and this extra torque of course also generates extra power. If this extra power is fed to the eddy current brake, a significant increase in braking torque can be obtained for the limited duration of time. Being able to generate high braking torque for a limited duration of time means that emergency braking operations and the like can be performed without additional braking torque from frictions brakes or the like, even for a heavily laden heavy duty vehicle, which is an advantage.

According to aspects, the control unit is arranged to perform a vehicle motion management function comprising force generation and motion support device (MSD) coordination. By incorporating the control of the braking device in an overall VMM system, vehicle control can be further optimized, which is an advantage.

According to aspects, the electric machine, the eddy current braking device, and the power distribution network is integrally formed in a single wheel end module (WEM), wherein the wheel end module comprises an output port for feeding electrical energy to the energy absorption device. This wheel end module simplifies vehicle assembly and also provides a simpler interface to the combined brake functions of the electric machine and the eddy current device.

According to aspects, the electric machine is an axial flux electric machine. An axial flux electric machine can be made relatively flat and therefore more easily integrated together with an eddy current device, which is an advantage.

There is also disclosed herein methods and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 3 is a functional view of a braking arrangement;

FIG. 4 is a graph illustrating an example of torque vs wheel axle speed;

FIG. 5 shows an eddy current brake comprising a plurality of conductive discs;

DETAILED DESCRIPTION OF EXAMPLE EMBODIMENTS OF THE INVENTION

Figure 1:
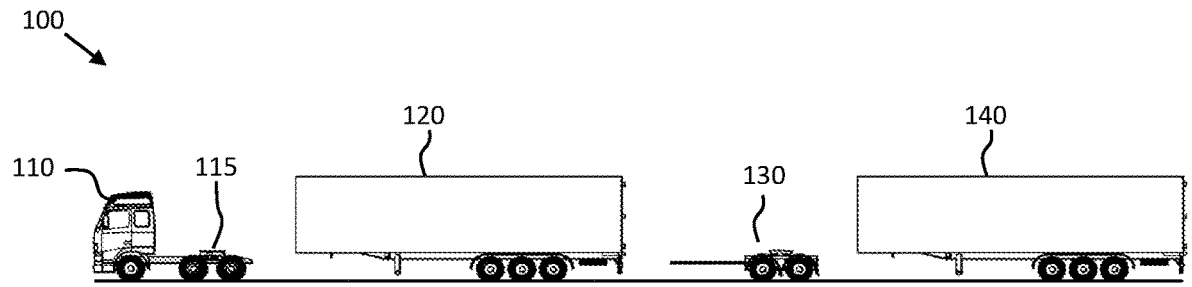
FIG. 1 shows an example vehicle combination comprising a dolly vehicle unit.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle combination 100 for cargo transport. The vehicle combination 100 comprises a truck or towing vehicle 110 configured to tow a first trailer unit 120 in a known manner, e.g., by a fifth wheel connection 115. To extend the cargo transport capability of the vehicle combination 100, a dolly vehicle 130 can be connected to the rear of the first trailer 120 via a drawbar. This dolly vehicle can then tow a second trailer 140, thus increasing the cargo transport capacity of the vehicle combination.

Each of the vehicle units 110, 120, 130, 140 comprise means for generating negative torque, i.e., a braking torque to decelerate the vehicle combination 100.

A dolly vehicle 130 is traditionally a passive vehicle comprising no driven or steerable axles, and with a relatively short wheelbase. It has recently been shown that self-powered dolly vehicles may provide both increased fuel efficiency and maneuverability. This type of self-powered dolly vehicle comprises an on-board energy source, such as a battery, super-capacitor or a fuel cell stack, and at least one pair of driven wheels. Some self-powered dolly vehicles may also be steerable.

Both the truck 110 and the self-powered steerable dolly vehicle 130, and potentially also one or more of the trailer units 120, 140 may comprise electric machines for propulsion and regenerative braking. However, most regenerative electric brakes are not capable of generating enough braking torque to perform hard braking, such as may be required during an emergency maneuver or the like, where accelerations on the order of −0.25G to −0.75G may be required. A heavy-duty vehicle such as the vehicle 100 therefore normally comprises friction brakes to complement the regenerative braking by the electric machine.

However, as mentioned above, it is required to be able to brake the vehicle 100 as it travels down steep long hills and the like, where friction brakes risk onset of brake fading. Thus, an endurance braking system, such as an engine brake or hydraulic brake system for prolonged periods of braking may be required in addition to the regenerative brakes and the friction brakes. This rather complicated braking system drives cost and also requires extensive servicing.

It is most advantageous to be able to generate high braking torque by a self-powered dolly vehicle unit. This is because the dolly vehicle unit 130 can act as an anchor to brake the heavy duty vehicle 100, and also to reduce overshoot by the second trailer 140 during hard turning, e.g., during evasive maneuvering. Thus, the techniques disclosed herein are particularly suitable for use with self-powered dolly vehicle units 130.

It is appreciated that the techniques and devices disclosed herein can be applied together with a wide variety of electrically powered vehicle units, not just those exemplified in FIG. 1.

Figure 2:
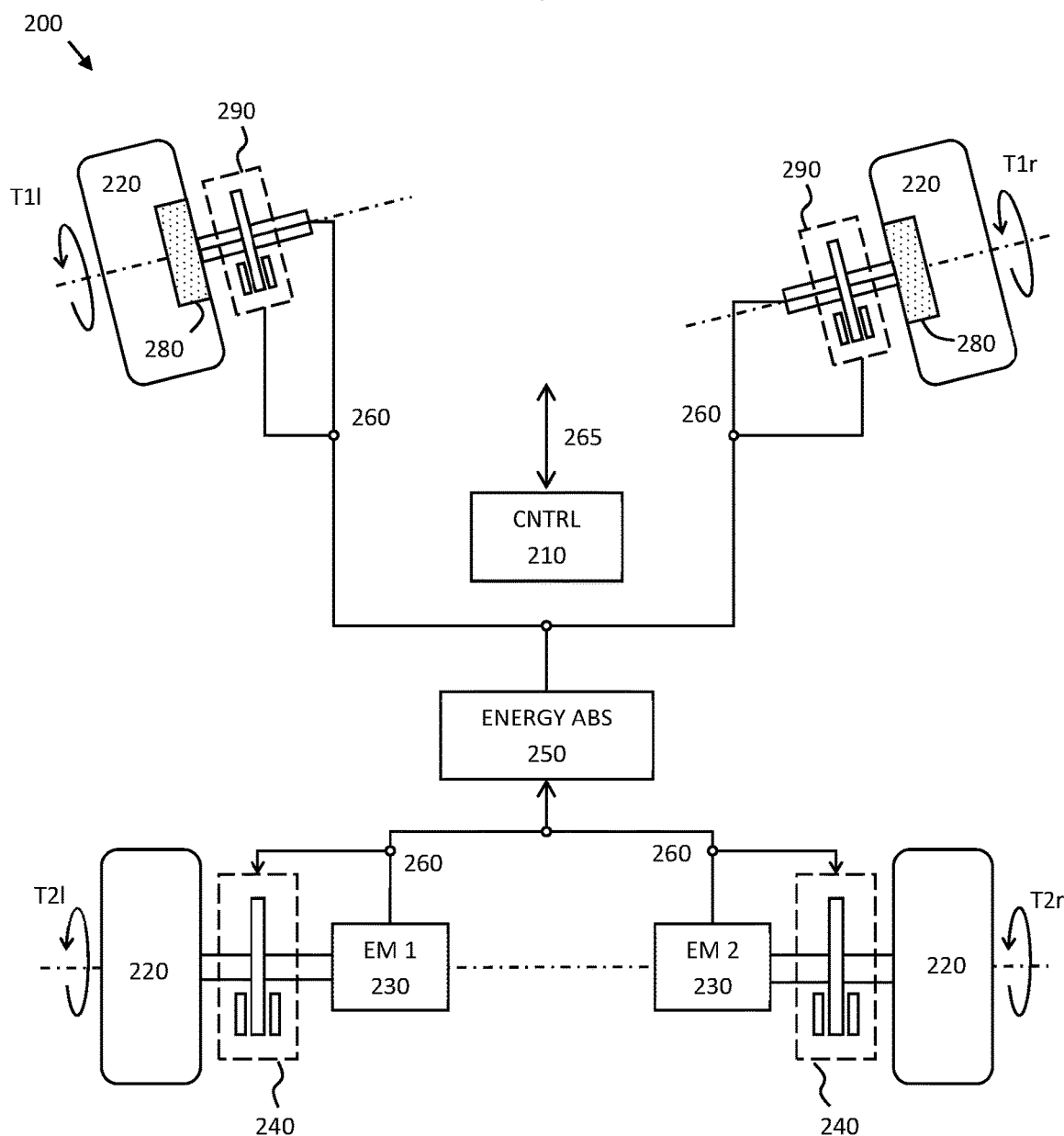
FIG. 2 illustrates an example braking arrangement for braking a vehicle unit.

FIG. 2 shows a braking arrangement 200 for decelerating a heavy duty vehicle 100. The arrangement comprises a control unit 210 and least one electric machine 230, 280 arranged for regenerative braking. The arrangement further comprises an electrical energy absorption device 250, an eddy current braking device 240, 290, and a power distribution network 260 arranged to connect the electric machine 230, 280 to the energy absorption device 250, and to the eddy current braking device 240, 290. The control unit 210 is configured to distribute regenerated electrical power from the electric machine 230, 280 between the energy absorption device 250 and the eddy current braking device 240, 290 by the power distribution network 260 in dependence of a target deceleration value of the heavy duty vehicle 100.

Herein, a heavy-duty vehicle 100 is taken to be a vehicle designed for the handling and transport of heavier objects or large quantities of cargo. As an example, a heavy-duty vehicle could be a semi-trailer vehicle or a truck as described above. As another example, a heavy-duty vehicle could be a vehicle designed for use in construction, mining operations, and the like.

The control unit 210 can also be configured to control various functions in addition to power distribution, such as steering. It may be equipped with a communication interface 265 arranged for communication with other units comprised in the vehicle 100. This control unit will be discussed in more detail below in connection to FIG. 9.

The electric machine 230, 280 is arranged to generate a torque T1$l$, T1$r$, T2$l$, T2$r$ around the wheel axle and thereby control the rotation of the wheel 220. To achieve deceleration of the vehicle, a negative torque T1$l$, T1$r$, T2$l$, T2$r$ may be generated by the electric machine 230, 280 through regenerative braking. A negative torque can also be generated by the eddy current braking device 240, 290.

With reference also to FIG. 5, an eddy current braking device 240, 290 comprises at least one electrically conductive component 510, which may be in the shape of a disc, and at least one magnet 520, 530. To increase the ability to generate negative torque, and to improve heat dissipation ability, the eddy current braking device 240, 290 may comprise a plurality of electrically conductive discs 510 attached to a wheel axle 540 for generating braking torque. FIG. 5 shows an example of such an eddy current braking device with a plurality of electrically conductive discs 510. However, a single disc is of course sufficient for generating braking torque by the eddy current braking device. More than one magnet can of course also be used with one or more respective electrically conductive discs.

The electrically conductive discs are made from an electrically conductive material, which is herein considered to be a material with an electric conductivity similar to that of a metal, substantially an electric conductivity above 100000 Siemens/m. Optionally, the electrically conducting material may be a metal that reacts weakly to magnetic fields, such as copper or aluminum.

The electrically conductive disc or discs 510 are arranged such that when an axle 540 to which the eddy current braking device 240, 290 is attached is rotating, the electrically conductive disc or discs 510 are also rotating. This may for example be accomplished by attaching the conductive disc 510 directly to the axle 540, or via some form of gear arrangement.

The at least one magnet 520, 530 comprises an electromagnet with a conductive coil and optionally also a core comprising a ferri- or ferromagnetic material, for example iron, permalloy, or ferrite. When an electric current is run through the conductive coils a magnetic field is generated in and around the coil according to Ampere's law. The core concentrates the magnetic flux, thereby producing a stronger magnetic field.

The at least one magnet 520, 530 is arranged such that when the eddy current brakes are engaged the electrically conducting disc 510 is exposed to the magnetic field between the two magnetic poles, with the field lines of the magnetic field substantially perpendicular to the surface of the disc 510. As an example, the magnet 520, 530 could be a magnetic circuit, i.e. an electromagnet where the core is shaped to form a loop, and the electrically conductive disc 510 could be inserted into an air gap of the magnetic circuit. As another example, two magnets 520, 530 could be arranged with the north pole of the first magnet and the south pole of the second magnet facing each other, with the electrically conductive disc 510 inserted between the north and south pole.

When the axle 540 is rotating and the eddy current braking device 240, 290 is engaged, the magnetic field generated by the magnet 520, 530 induces eddy currents in the moving electrically conductive disc 510 as predicted by Faraday's law of induction. Said eddy currents generate a magnetic field that counteracts the magnetic field generated by the magnet, thereby creating a drag force on the electrically conducting disc 510. The electrons forming part of the induced eddy currents are subject to an electrical resistance when moving through the electrically conductive disc 510, causing some of the energy of the moving electrons to be dissipated as heat. Through this mechanism, the kinetic energy of the electrically conductive disc 510 is converted into heat.

When the eddy current braking device 240, 290 is not engaged, the electrically conductive disc 510 is not exposed to a magnetic field from the magnet 520, 530. If the magnet 520, 530 is an electromagnet, the strength of the generated magnetic field depends on the electric current being passed through the conductive coil. In a situation when the eddy current braking device 240, 290 is not engaged, the strength of this electric current may be substantially zero. Thus, advantageously, when the eddy current brakes are not engaged, no drag resistance or the like is experienced. This is a major benefit compared to standard service brakes (friction brakes such as disc brakes and drum brakes) which are usually associated with some residual applied brake pad force due to not releasing correctly when not applied, generating rolling resistance and heat.

Figure 11:
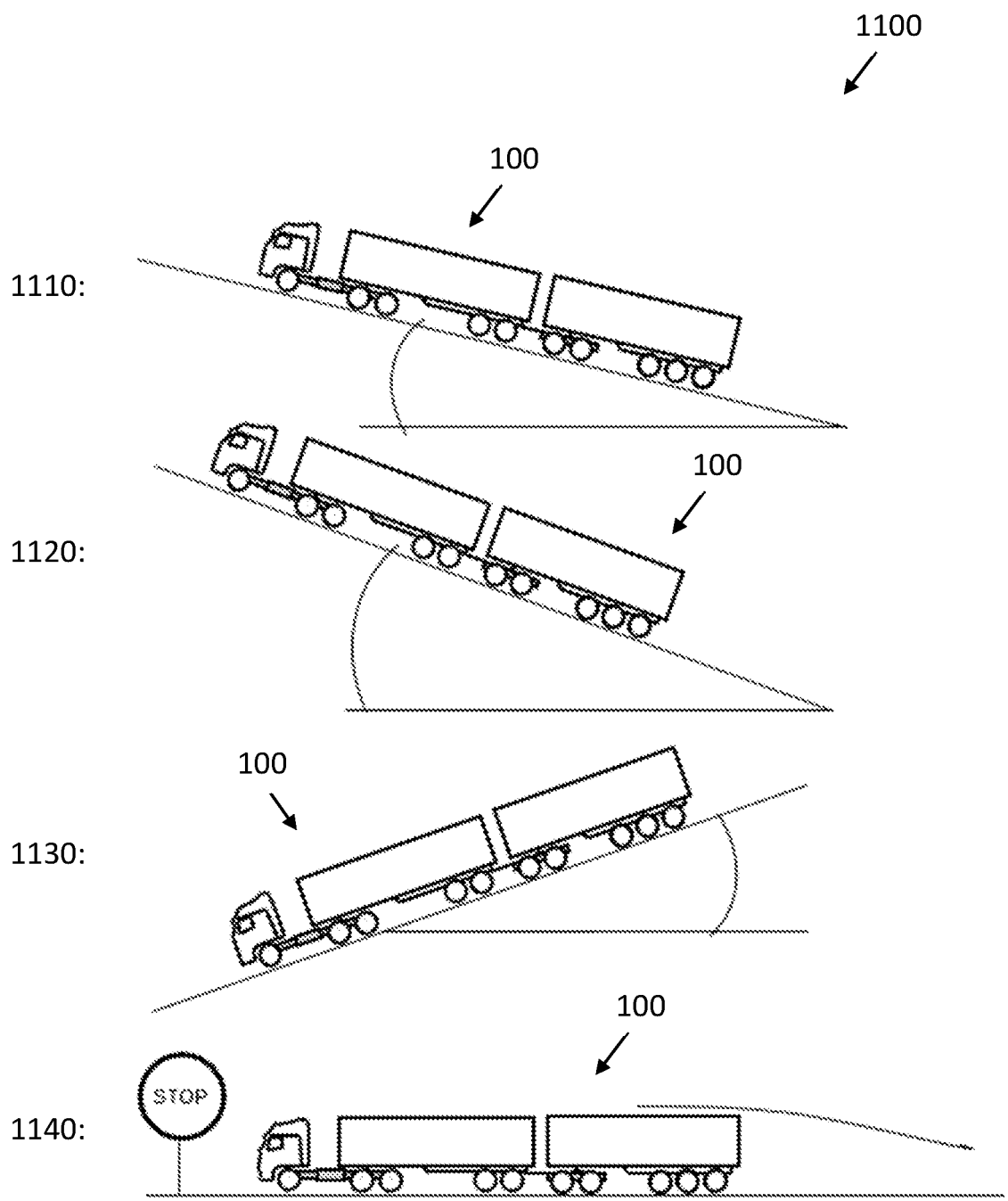
FIG. 11 illustrates some example heavy duty vehicle use cases.

FIG. 11 illustrates four use cases 1100 which a heavy duty vehicle 100 must be able to operate in. The vehicle 100 must be able to start in slopes 1110 (startability), even if the vehicle 100 is heavily loaded and the road friction is not ideal. The vehicle must also be able to negotiate even steeper slopes at constant velocity 1120, e.g., 70 km/h (positive grade ability). Downhill grade ability performance 1130 is perhaps even more important, which means that the vehicle 100 must be able to limit speed when driving downhill for longer distances (endurance braking). Finally, acceleration and braking capability implies that peak torque requirements, both on positive and on negative torque, must be met by the vehicle MSDs.

The required longitudinal torque can be expressed as $$F_{x,req} = m_{GCW} a_{x,req} + 0.5 C_d A_f \rho_{air} v_x^2 + g C_r m_{GCW} + m_{GCW} g \sin\left(\mathrm{atan}\left(\frac{s}{100}\right)\right)$$

where $m_{GCW}$ is the vehicle gross combination weight, $a_{x,req}$ is the required acceleration (which is zero or very small for use cases 1110, 1120 and 1130), $C_d A_f$ is the product of air drag coefficient $C_d$ and vehicle front area $A_f$, $\rho_{air}$ represents air density, $v_x$ is the vehicle speed, g is the gravitational constant, $C_r$ is rolling resistance, and s is a slope percentage between 0 and 100.

In uphill driving positive torque scenarios, the terms $0.5 C_d A_f \rho_{air} v_x$ and $g C_r m_{GCW}$ must be overcome by the propulsion MSDs, while in downhill scenarios the terms instead help to brake the vehicle 100. This means that the electric machine must be dimensioned to support positive torque sufficient for use cases 1110 and 1120, while the combination of the eddy current braking device and the electric machine must be dimensioned to provide a combined negative torque to support use cases 1130 and hard braking according to use case 1140.

It is appreciated that the vehicle 100 will, most likely, comprise several electric machines and eddy current braking devices which will be coordinated to meet torque requirements.

As previously described, the electric power used to generate the electric current in the conductive coil may be regenerated electric power from the electric machine 230, 280.

However, the electric power used to generate the electric current could also come from an energy storage device such as a battery or a super-capacitor.

An electrical energy absorption device 250, 310, 320 can for example be a device that stores electrical energy, such as a rechargeable battery 310 or a super-capacitor. An electrical energy absorption device 250, 310, 320 can also be a device that dissipates electrical energy, such as a resistor 320 which converts the electrical energy to heat without providing any useful effect such as braking or energy storage. An electrical energy absorption device 250, 310, 320 may also be a combination of devices that store electrical energy and devices that dissipate electrical energy.

FIG. 3 further illustrates the braking arrangement described above from a functional perspective. The control unit 210 is arranged to send a braking request to the electric machine 230, 280 via a communication interface 330. During regenerative braking, the electric machine 230, 280 generates electric power which is transmitted to the distribution network 260 via a power interface 340.

The distribution network is arranged to distribute the generated electric power between the eddy current braking device 240, 290 and an energy absorption device 250, 310, 320 over two respective power distribution interfaces 360, 370 in dependence of input received from the control unit 210 over a control interface 350. The control unit 210 is arranged to obtain an energy absorption capability of the energy absorption device 250, 310, 320 over interface 380 and a braking and energy dissipation capacity of the eddy current braking device 240, 290 over interface 390, and modify the input to the distribution network 260 in dependence of these parameters.

As an example, if a large deceleration value of the vehicle 100 is required, the corresponding required negative torque may exceed what can be generated by the electric machine 230, 280 alone. A larger fraction of the regenerated electric power may then be directed to the eddy current braking device 240, 290, which will in turn generate a negative torque, resulting in a larger total negative torque than that produced by the electric machine 230, 290 alone. This way a very strong braking force can be generated, which is an advantage.

As another example, if the capacity of the energy absorption device 250, 310, 320 is insufficient to absorb the regenerated electric power, a larger fraction of the regenerated electric power may be directed to the eddy current braking device 240, 290 even if the required torque could be produced solely by the electric machine 230, 280. Directing the regenerated electric power to the eddy current braking device 240, 290 will result in an additional negative torque being generated by the eddy current braking device 240, 290.

This serves both to dissipate the excess regenerated electric power and to decrease the negative torque that needs to be produced by the electric machine 230, 280, resulting in less electric power being regenerated. This way the specification and requirements imposed on the peak energy absorption capability of the energy absorption device can be relaxed, which is an advantage.

Thus, the control unit 210 may be configured to control the distribution of regenerated electrical power from the electric machine 230, 280 between the energy absorption device 250, 310, 320 and the eddy current braking device 240, 290 in dependence of an energy absorption capability of the energy absorption device 250, 310, 320.

An energy absorption capability of the energy absorption device 250, 310, 320 may indicate a maximum amount of energy that the energy absorption device 250, 310, 320 can absorb without sustaining damage. An energy absorption capability of an energy absorption device 250, 310, 320 may also indicate a maximum rate of energy absorption by the energy absorption device 250, 310, 320, or a combination of a maximum amount of energy that can be absorbed and a maximum rate at which it can be absorbed.

For a battery 310, an energy absorption capability may be determined by the difference between the current state of charge of the battery 310 and the maximum charge of the battery 310. For a resistor 320, an energy absorption capability may be determined by the power rating of the resistor 320, i.e. the amount of power that can be dissipated via the resistor 320 without causing it to overheat or become damaged. It is appreciated that the energy absorption capability of a device can vary over time, both short-term and long-term.

For instance, an already overheated resistor will have a smaller energy absorption capability compared to a cool un-used resistor, causing variation over time-spans such as tens of minutes or even tens of seconds. A new battery often has better energy absorption capabilities compared to an older more worn battery, thus the energy absorption capability may also range over a time span of months or even years.

The energy absorption device may comprise a rechargeable battery 310, and the control unit 210 may configured to control the distribution of regenerated electrical power from the electric machine 230, 280 between the rechargeable battery 310 and the eddy current braking device 240, 290 in dependence of a state of charge, SOC, of the rechargeable battery 310. In particular, a larger fraction of the regenerated electrical power may be directed to the rechargeable battery 310 if the state of charge, SOC, is low. Conversely, if the state of charge, SOC, is high or the battery is fully charged, a larger fraction of the regenerated electrical power may be directed to the eddy current braking device 240, 290.

Also, the energy absorption device may comprise a resistor 320 configured to dissipate excess electrical energy from the electric machine 230, 280 and to regulate a voltage level of the braking arrangement. That is, the electrical resistance of the resistor 320 may be selected such that a voltage experienced by other components of the braking arrangement, e.g. the eddy current braking device 240, 290 or the energy absorption device 250, 310, 320, is kept at a desired value.

With reference to FIG. 4, the braking torque capability level Tcap of the electric machine 230, 280 may generally correspond to a torque level that is sustainable over an extended period of time. An extended period of time could in this context be 60 seconds or more.

Thus, a sustainable torque level may e.g. depend on a capacity of the cooling system of the electric machine 230, 280.

However, the electric machine 230, 280 is also normally associated with a peak braking torque level Tpeak above a braking torque capability level of the electric machine. This peak braking torque level can be maintained by the electric machine for a limited duration of time.

The control unit 210 may then be configured to request a braking torque level from the electric machine 230, 280 between the peak braking torque level and the braking torque capability level to decelerate the heavy duty vehicle. A limited duration of time could for example be 30 seconds or less.

Applying a braking torque above Tcap will result in the generation of additional electric power. Optionally, the control unit may be arranged to distribute the additional electric power to the eddy current braking device 240, 290. In addition to the braking torque generated by the electric machine, a braking torque will then be generated by the eddy current braking device, resulting in a high total braking torque. For example, the total peak braking torque Tpeak may approach four times the total continuous maximum braking torque of the electric machine, though only for the limited amount of time during which a braking torque above Tcap can be sustained. This may for example be useful for emergency braking.

FIG. 4 comprises a graph 400 illustrating braking torque as a function of the angular velocity of the wheel axle 540. At low to moderate angular velocities, braking torques up to the braking torque capability level Tcap can be applied for an extended period of time, and braking torques up to the peak braking torque level Tpeak can be applied for a limited time.

At high angular velocities, the electric machine 230, 280 may become unable to sustain the braking torque, leading to a decrease in braking torque with increasing angular velocity as seen in FIG. 4.

A consequence of this decrease is that less electric power is regenerated, meaning that less electric power from the electric machine 230, 280 is available to power the eddy current braking device 240, 290. According to aspects, the braking arrangement 200, 300 may be arranged to power the eddy current braking device 240, 290 from a different energy source at high angular velocities of the wheel axle 540. This energy source may for example be a battery 320 or a super-capacitor. According to other aspects, the braking arrangement 200, 300 may also be arranged to power the eddy current braking device from a different energy source if the function of the electric machine 230, 280 becomes impaired.

According to aspects, the control unit 210 may be arranged to perform a vehicle motion management function comprising force generation and motion support device, MSD, coordination.

Figure 6A:
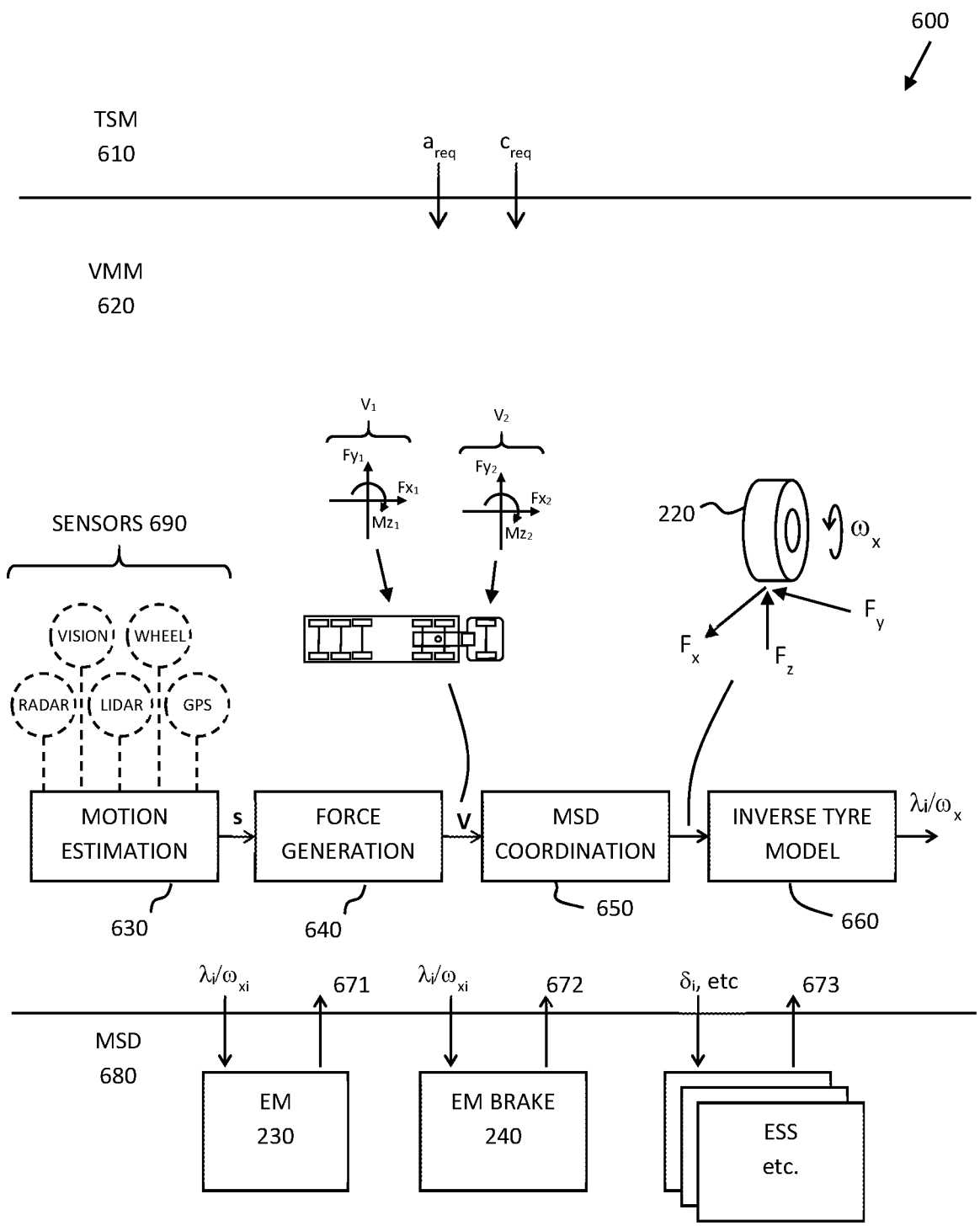
FIG. 6A schematically illustrates functions of a vehicle control system.
Figure 7:
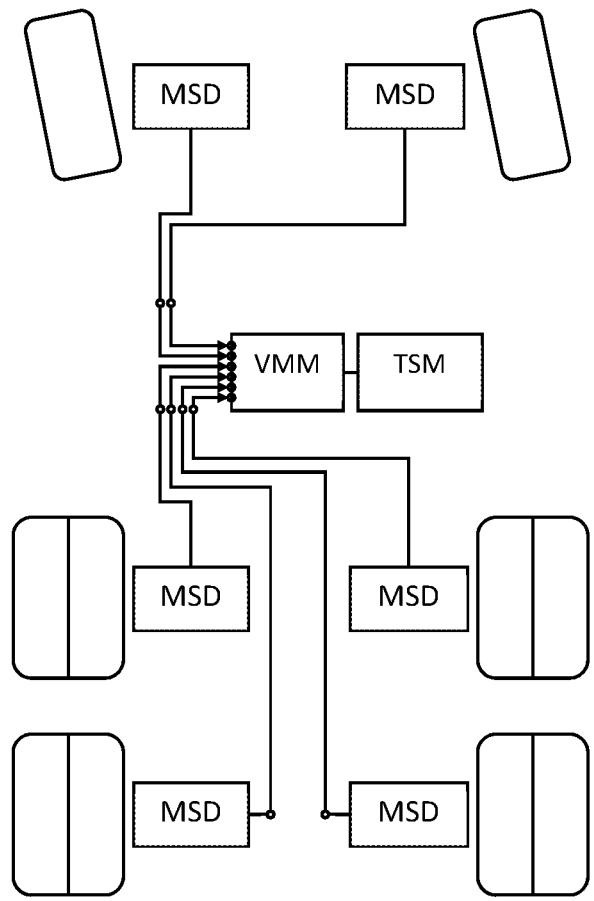
FIG. 7 shows a vehicle motion support device control system.

FIG. 6A schematically illustrates functionality 600 for controlling a wheel 220 by some example motion support device (MSDs) here comprising the electric machine 230 and the eddy current brake 240. The control is based on, e.g., measurement data obtained from vehicle sensors 690 such as wheel speed sensors, global positioning system (GPS) sensors, radar sensors, lidar sensors, and also vision based sensors such as camera sensors and infra-red detectors. An example vehicle motion support device control system is also shown in FIG. 7.

A traffic situation management (TSM) function 610 plans driving operation with a time horizon of, e.g., 10 seconds or so. This time frame corresponds to, e.g., the time it takes for the vehicle 100 to negotiate a curve. The vehicle maneuvers, planned and executed by the TSM, can be associated with acceleration profiles $a_{req}$ and curvature profiles $c_{req}$ which describe a desired vehicle velocity and turning for a given maneuver. The TSM function 610 continuously requests the desired acceleration profiles $a_{req}$ and curvature profiles $c_{req}$ from a vehicle motion management (VMM) function 620 which performs force allocation to meet the requests from the TSM in a safe and robust manner. The VMM function continuously feeds back capability information to the TSM function detailing the current capability of the vehicle in terms of, e.g., forces, maximum velocities, and accelerations which can be generated.

Acceleration profiles and curvature profiles may also be obtained from a driver of the heavy duty vehicle via normal control input devices such as a steering wheel, accelerator pedal and brake pedal. The source of said acceleration profiles and curvature profiles is not within scope of the present disclosure and will therefore not be discussed in more detail herein.

The VMM function 620 operates with a time horizon of about 1 second or so, and continuously transforms the acceleration profiles $a_{req}$ and curvature profiles $c_{req}$ into control commands for controlling vehicle motion functions, actuated by the different MSDs 230, 240 of the vehicle 100 which in turn report back capabilities to the VMM function 620. The different capabilities are used by the VMM function as constraints in the vehicle control.

The VMM function 620 performs vehicle state or motion estimation 630, i.e., the VMM function 620 continuously determines a vehicle state s comprising positions, speeds, accelerations and articulation angles of the different units in the vehicle combination by monitoring operations using various sensors 690 arranged on the vehicle 100, often but not always in connection to the MSDs.

The result of the motion estimation 630, i.e., the estimated vehicle state s, is input to a force generation module 640 which determines the required global forces and moments Fx Fy Mz, V=[$V_1$, $V_2$, $V_3$], and for the different vehicle units to cause the vehicle 100 to move according to the requested acceleration and curvature profiles $a_{req}$, $c_{req}$. The required global force vector V is input to an MSD coordination function 650 which allocates wheel forces and also coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors and/or lidar sensors, and translating this vehicle unit motion into a local coordinate system of a given wheel 220 (in terms of, e.g., longitudinal and lateral velocity components), it becomes possible to accurately estimate wheel slip in real time by comparing the vehicle unit motion in the wheel reference coordinate system to data obtained from the wheel speed sensor arranged in connection to the wheel 220.

Figure 6B:
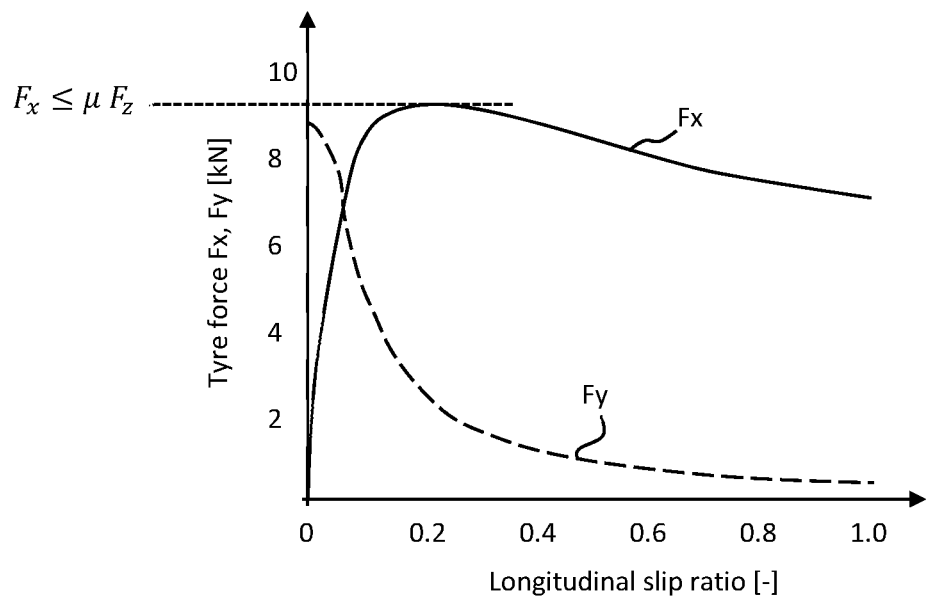
FIG. 6B is a graph of an example relationship between wheel force and wheel slip.

A tyre model, exemplified in FIG. 6B, can be used to translate between a desired longitudinal tyre force $Fx_i$ for a given wheel i and an equivalent wheel slip $\lambda_i$ for the wheel.

Wheel slip $\lambda$ relates to a difference between wheel rotational velocity and speed over ground and will be discussed in more detail below. Wheel speed w is a rotational speed of the wheel, given in units of, e.g., rotations per minute (rpm) or angular velocity in terms radians/second (rad/sec) or degrees/second (deg/sec). A tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

To summarize, the VMM function 620 manages both force generation and MSD coordination, i.e., it determines what forces that are required at the vehicle units in order to fulfil the requests from the TSM function 610, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

For instance, the VMM function 620 keeps track of the state of charge of the electrical energy system (ESS) of the vehicle, i.e., the traction batteries or the fuel cell system as well as the current state of any brake resistors, and determines how to best meet braking torque requirements by the electric machines and by the eddy current braking devices. The VMM directs electrical energy to the eddy current brakes if this is favorable in a given situation, and to the ESS otherwise.

The interface between VMM and MSDs capable of delivering torque to the vehicle's wheels has, traditionally, been focused on torque based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip based request on the interface between VMM and the MSD controller, thereby shifting the difficult actuator speed control loop to the MSD controllers, which generally operate with a much shorter sample time compared to that of the VMM function. Such an architecture can provide much better disturbance rejection compared to a torque based control interface and thus improves the predictability of the forces generated at the tyre road contact patch.

With reference to FIG. 6A, the inverse tyre model block 660 translates the required wheel forces $Fx_i$, $Fy_i$ determined for each wheel, or for a subset of wheels, by the MSD coordination block 650 into equivalent wheel speeds $\omega_{wi}$ or wheel slips $\lambda_i$. These wheel speeds or slips are then sent to the respective MSD controllers 680. The MSD controllers report back capabilities 671-673 which can be used as constraints in, e.g., the MSD coordination block 650.

Longitudinal wheel slip $\lambda$ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The VMM 620 and optionally also the MSD control units 680 maintains information on $v_x$ (in the reference frame of the wheel), while a wheel speed sensor or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre 220 is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$ by the wheel since, normally, $F_y \leq \mu F_z$, where y is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

According to aspects, slip control during endurance braking can be improved by simultaneously using several types of braking, i.e. what is known as brake blending. As an example, the control unit 210 may be configured to control the distribution of regenerated electrical power from the electric machine 230, 280 between the energy absorption device 250, 310, 320 and the eddy current braking device 240, 290 such that a constant baseline torque level is generated by the eddy current braking device 240, 290. The torque applied by the electric machine can then be modulated to control wheel slip at a desired wheel slip level. With the eddy current braking device 240, 290 generating a baseline torque level, the electric machine 230, 280 can be used to control wheel slip with low latency.

Vehicle downhill grade ability relates to the ability of a heavy duty vehicle to drive down long hills at constant cruising speed. The air resistance and the rolling resistance from the road decelerates the vehicle, while the gravitational pull on the vehicle provides accelerating force. Normally, a retarder or engine brake is used to provide endurance braking. However, the disclosed braking arrangements are possible to design so the endurance braking is supported without need for additional retarders, friction brakes, or the like.

To guarantee vehicle downhill grade ability, the eddy current braking device and the electric machine are dimensioned to support a constant cruising speed, e.g., somewhere between 80-110 km/h, during extended downhill driving. To design for downhill grade ability means that the electric machine is dimensioned to provide a continuous negative torque level at a given level and also arranged to distribute the regenerated energy to the eddy current braking device when the energy absorption capability of the energy absorption device is depleted. The eddy current braking device is dimensioned to absorb this energy level. Thus, vehicle downhill grade ability is guaranteed.

The electric machine 230, 280, the eddy current braking device 240, 290, and the power distribution network 260 may be integrally formed in a single wheel end module. Such a wheel end module may comprise an output port for feeding electrical energy to the energy absorption device 250, 310, 320.

The wheel end module may also comprise a control port by which it can be connected to the control unit 210. The control unit 210 may then be arranged to send e.g. a torque request or a wheel slip request as described above to the wheel end module together with an energy absorption capability of an energy absorption device 250, 310, 320 that is external to the wheel end module. Within the wheel end module, the requested torque or wheel slip can then be generated by the electric machine 230, 280 and the eddy current braking device 240, 290 in such a way that the electrical energy fed to the energy absorption device 250, 310, 320 does not exceed the energy absorption capability.

According to aspects, the electric machine 230, 280 may be an axial flux electric machine. In contrast to a radial flux electric machine, in which the stator forms a substantially cylindrical shell concentric with the substantially circular rotor and the magnetic flux is directed radially between the rotational axis of the rotor and the stator, the magnetic flux in an axial flux electric machine is directed along the rotational axis of the rotor. Both the rotor and the stator in an axial flux electric machine may be thought of as discs, placed next to each other with the axis of rotation of the rotor perpendicular to both discs. During operation, the magnetic flux between rotor and stator will then be parallel to the axis of rotation.

Optionally, more than one stator may be used. Axial flux electric machines may be associated with higher power densities and a less complicated manufacturing process compared to radial flux electric motors.

There is also herein disclosed a heavy duty vehicle unit 110, 120, 130, 140 comprising a braking arrangement 200, 300 as described above.

Figure 8:
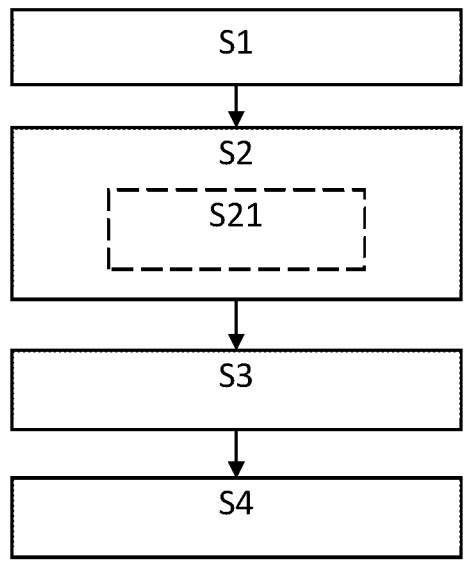
FIG. 8 is a flow chart illustrating a method.

The flowchart in FIG. 8 shows a method, performed by a control unit 210, for decelerating a heavy duty vehicle 100. The method comprises obtaining S1 a deceleration request indicative of a desired braking torque and determining S2 if regenerative braking by an electric machine 230, 280 associated with a braking torque capability is sufficient to meet the deceleration request. The method further comprises applying S3 a braking torque by a combination of the electric machine 230, 280 and an eddy current braking device 240, 290 powered by the electric machine 230, 280 if the regenerative braking capability of the electric machine 230, 280 is not sufficient to meet the deceleration request.

As an example, a deceleration request may be obtained from a traffic situation management (TSM) function as described above. As another example, the deceleration request may be obtained via pedal inputs from the driver.

When a braking torque is applied using both the electric machine 230, 280 and the eddy current braking device 240, 290, the eddy current braking device 240, 290 may be powered directly by the electric machine 230, 280. That is, as regenerative braking by the electric machine 230, 280 results in the generation of electric power, some of this electric power is directed to power the conductive coil of the electromagnet comprised n the eddy current braking device 240, 290.

Using the electric machine 230, 280 and the eddy current braking device 240, 290 in combination, it is possible to generate higher braking torques than using the electric machine 230, 280 alone. For example, the method may also comprise controlling S4 the electric machine 230, 280 to generate a braking torque above the braking capability of the electric machine for a limited duration of time to meet the deceleration request. The additional electrical power generated during this time can be used to directly power the eddy current braking device 240, 290, which results in a substantial increase of the total braking torque.

The method may also comprise that the braking capability of the electric machine 230, 280 is determined S21 in dependence of an energy absorption capability of an energy absorption device 250, 310, 320.

An energy absorption device 250, 310, 320 may be a device that dissipates electric energy into heat, such as a resistor 320, or a device that stores electric energy, such as a battery 310. An energy absorption capability of a resistor 320 may be determined by its power rating, i.e. how much power it can dissipate without overheating or sustaining damage. The energy absorption capability of a battery 310 may be determined by a difference between the current state of charge of the battery 310 and the maximum charge.

If the energy absorption capability of the energy absorption device is large, e.g. if the state of charge of the battery 310 is low, it can absorb a larger amount of regenerated electric power from the electric machine 230, 280 and the braking capability may thus be higher. If the battery is close to its maximum charge, the braking capability may be lower as the regenerated electric power cannot be absorbed by the battery 310.

There is also herein disclosed a control unit 210 comprising processing circuitry 910 configured to perform a method as described above, and a computer program 1020 comprising program code means for performing a method as previously described when said program is run on a computer or on processing circuitry 910 of a control unit (210.

Figure 9:
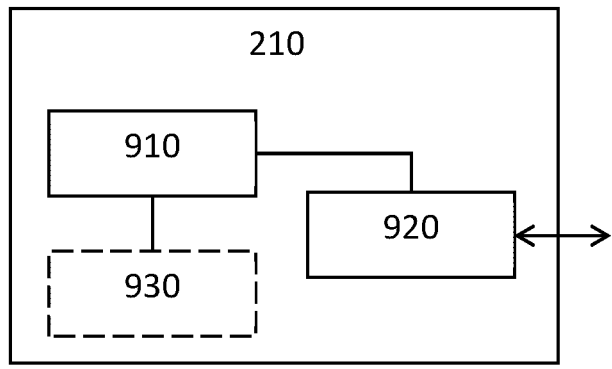
FIG. 9 schematically illustrates a control unit.

FIG. 9 schematically illustrates, in terms of a number of functional units, the components of a control unit 210 according to embodiments of the discussions and methods disclosed herein. This control unit 210 may be comprised in a vehicle unit 110, 120, 130, e.g., in the form of a vehicle motion management (VMM) unit configured to perform force allocation and the like. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 210 to perform a set of operations, or steps, such as the methods discussed in connection to FIG. 8. For example, the storage medium 930 may store the set of operations, and the processing circuitry 910 may be configured to retrieve the set of operations from the storage medium 930 to cause the control unit 210 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 210 may further comprise an interface 920 for communications with at least one external device, such as an electric machine or a gearbox. As such the interface 920 may comprise one or more transmitters and receivers, comprising analogue and digital components and a suitable number of ports for wireline or wireless communication.

The processing circuitry 910 controls the general operation of the control unit 210, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
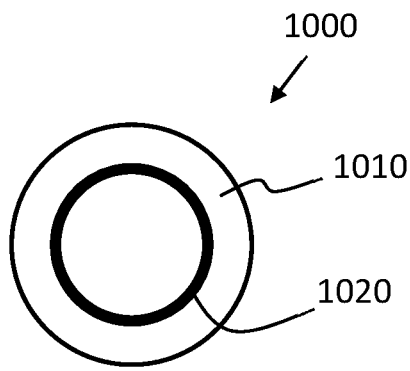
FIG. 10 shows an example computer program product.

FIG. 10 illustrates a computer readable medium 1010 carrying a computer program comprising program code means 1020 for performing, e.g., the methods illustrated in FIG. 8, when said program product is run on a computer. The computer readable medium and the code means may together form a computer program product 1000.

The invention claimed is:

1. A braking arrangement for decelerating a heavy duty vehicle, the arrangement comprising a control unit, at least one electric machine arranged for regenerative braking, an electrical energy absorption device, an eddy current braking device, and a power distribution network arranged to connect the electric machine to the energy absorption device and to the eddy current braking device, wherein the control unit is configured to distribute regenerated electrical power from the electric machine between the energy absorption device and the eddy current braking device by the power distribution network in dependence of a target deceleration value of the heavy duty vehicle, wherein the control unit is also configured to control the distribution of regenerated electrical power from the electric machine between the energy absorption device and the eddy current braking device in dependence of an energy absorption capability of the energy absorption device, and wherein the control unit is additionally configured to control the distribution of regenerated electrical power from the electric machine between the energy absorption device and the eddy current braking device such that a constant baseline torque level is generated by the eddy current braking device, the torque applied by the electric machine being modulated to control wheel slip at a desired wheel slip level.

2. The braking arrangement according to claim 1, wherein the eddy current braking device comprises a plurality of electrically conductive discs attached to a wheel axle for generating braking torque.

3. The braking arrangement according to claim 1, wherein the energy absorption device comprises a rechargeable battery, wherein the control unit is configured to control the distribution of regenerated electrical power from the electric machine between the rechargeable battery and the eddy current braking device in dependence of a state of charge, SOC, of the rechargeable battery.

4. The braking arrangement according to claim 1, wherein the energy absorption device comprises a resistor configured to dissipate excess electrical energy from the electric machine and to regulate a voltage level of the braking arrangement.

5. The braking arrangement according to claim 1, wherein the electric machine is associated with a peak braking torque level (Tpeak) above a braking torque capability level of the electric machine, which peak braking torque level can be maintained by the electric machine for a limited duration of time, wherein the control unit is configured to request a braking torque level from the electric machine between the peak braking torque level and the braking torque capability level to decelerate the heavy duty vehicle.

6. The braking arrangement according to claim 1, wherein the control unit is arranged to perform a vehicle motion management function comprising force generation and motion support device, MSD, coordination.

7. The braking arrangement according to claim 1, wherein the electric machine, the eddy current braking device, and the power distribution network is integrally formed in a single wheel end module, wherein the wheel end module comprises an output port for feeding electrical energy to the energy absorption device.

8. The braking arrangement according to claim 1, wherein the electric machine is an axial flux electric machine.

9. A heavy duty vehicle unit comprising a braking arrangement according to claim 1.

10. A method performed by a control unit for decelerating a heavy duty vehicle, the method comprising:

obtaining a deceleration request indicative of a desired braking torque, determining if regenerative braking by an electric machine associated with a braking torque capability is sufficient to meet the deceleration request, applying braking torque by a combination of the electric machine and an eddy current braking device powered by the electric machine if the regenerative braking capability of the electric machine is not sufficient to meet the deceleration request, and distributing the regenerated electrical power produced by the regenerative braking capability between an energy absorption device and the eddy current braking device such that a constant baseline torque level is generated by the eddy current braking device, the torque applied by the electric machine being modulated to control wheel slip at a desired wheel slip level.

11. The method according to claim 10, comprising:

controlling (S4) the electric machine to generate a braking torque above the braking capability of the electric machine for a limited duration of time to meet the deceleration request.

12. The method according to claim 10, wherein the braking capability of the electric machine is determined in dependence of an energy absorption capability of an energy absorption device.

13. A control unit comprising processing circuitry configured to perform a method according to claim 10.

14. A computer program comprising program code means for performing a method according to claim 10 when said program is run on a computer or on processing circuitry of a control unit.

* * * * *